(12) United States Patent
Brown, Jr. et al.

(10) Patent No.: US 11,930,742 B2
(45) Date of Patent: Mar. 19, 2024

(54) V-NOTCH TWINE DISK FOR VARIABLE TWINE QUANTITY HAY BALER KNOTTER

(71) Applicant: Pike Mfg. Corp., Alpena, MI (US)

(72) Inventors: Owen J. Brown, Jr., Pittsfield, IL (US); Bensend Thompson, Louisiana, MO (US); Thomas J. LePoidevin, Louisiana, MO (US)

(73) Assignee: Pike Mfg. Corp., Alpena, MI (US)

( * ) Notice: Subject to any disclaimer, the term of this patent is extended or adjusted under 35 U.S.C. 154(b) by 407 days.

(21) Appl. No.: 16/789,343

(22) Filed: Feb. 12, 2020

(65) Prior Publication Data
US 2020/0178470 A1   Jun. 11, 2020

Related U.S. Application Data

(63) Continuation-in-part of application No. 16/175,780, filed on Oct. 30, 2018, now Pat. No. 11,419,274.

(60) Provisional application No. 62/804,654, filed on Feb. 12, 2019.

(51) Int. Cl.
*A01F 15/14* (2006.01)
(52) U.S. Cl.
CPC ................................ *A01F 15/145* (2013.01)

(58) Field of Classification Search
CPC ....... A01F 15/145; A01F 15/14; A01D 59/04; A01D 37/00; A01D 37/02; A01D 39/00; A01D 59/00; B65B 13/26; B65B 27/12; B65H 69/04; B65H 29/68; B65H 2701/31; B65H 65/005
USPC .......................... 289/14, 10; 56/150, 151, 152
See application file for complete search history.

(56) References Cited

U.S. PATENT DOCUMENTS

| 313,094 A | * | 3/1885 | McLachlan | A01F 15/145 289/14 |
| 379,622 A | * | 3/1888 | Whiteley | A01F 15/145 289/10 |
| 827,666 A | * | 7/1906 | Quinn | A01F 15/145 289/10 |
| 2007/0180967 A1 | * | 8/2007 | Wright | A01F 15/145 83/651 |

* cited by examiner

*Primary Examiner* — Nathan E Durham
*Assistant Examiner* — Abby M Spatz
(74) *Attorney, Agent, or Firm* — WARNER NORCROSS + JUDD LLP

(57) ABSTRACT

A twine disk for a mechanical knotter of a hay bailer has four vee shaped V-notches each formed with a hook portion and two substantially straight edge portions to enable tying twine knots with either two strands or with four stands using the same knotter.

10 Claims, 4 Drawing Sheets

V-NOTCH TWINE DISK FOR VARIABLE TWINE QUANTITY HAY BALER KNOTTER

CROSS-REFERENCE TO RELATED APPLICATIONS

The present application claims priority from, and incorporates by reference in its entirety, provisional U.S. patent application 62/804,654 filed Feb. 12, 2019.

The present application claims priority from, and incorporates by reference in its entirety, U.S. patent application Ser. No. 16/175,780 filed Oct. 30, 2018.

BACKGROUND

Technical Field

Various embodiments of the present invention relate to balers for collecting and baling hay or other crops. More particularly, the present invention pertains to various embodiments of a baler knotter that collects and knots strings together around a bale.

Description of Related Art

To secure bales of fibrous material such as hay, twine is often wrapped around the bale and tied to create a hay bale. A crucial part of any hay baler is the mechanical knotter that ties knots in the twine during the baling process. Mechanical knotters are an incredibly complex piece of machinery. In order to operate properly the knotter must be able to grip the two strands of twine at certain times, and allow the twine strands to pass through it with little restriction at other times. During the typical knotting process, the two strands of twine must be held tightly while the bill hook grabs and turns the twine to form a knot out of the two strands.

The holding of the two twines is achieved by squeezing the twine between a twine disk and a twine holder. Conventional twine knotters have a twine disk with a semi-circular or oval shaped notch specially designed and optimized to handle the two strands of twine.

BRIEF DESCRIPTION OF THE DRAWING

The accompanying drawing, which is incorporated in and constitutes part of the specification, illustrates various embodiments of the invention. Together with the general description, the drawing serves to explain the principles of the invention. In the drawing.

DESCRIPTION

Figure 1:
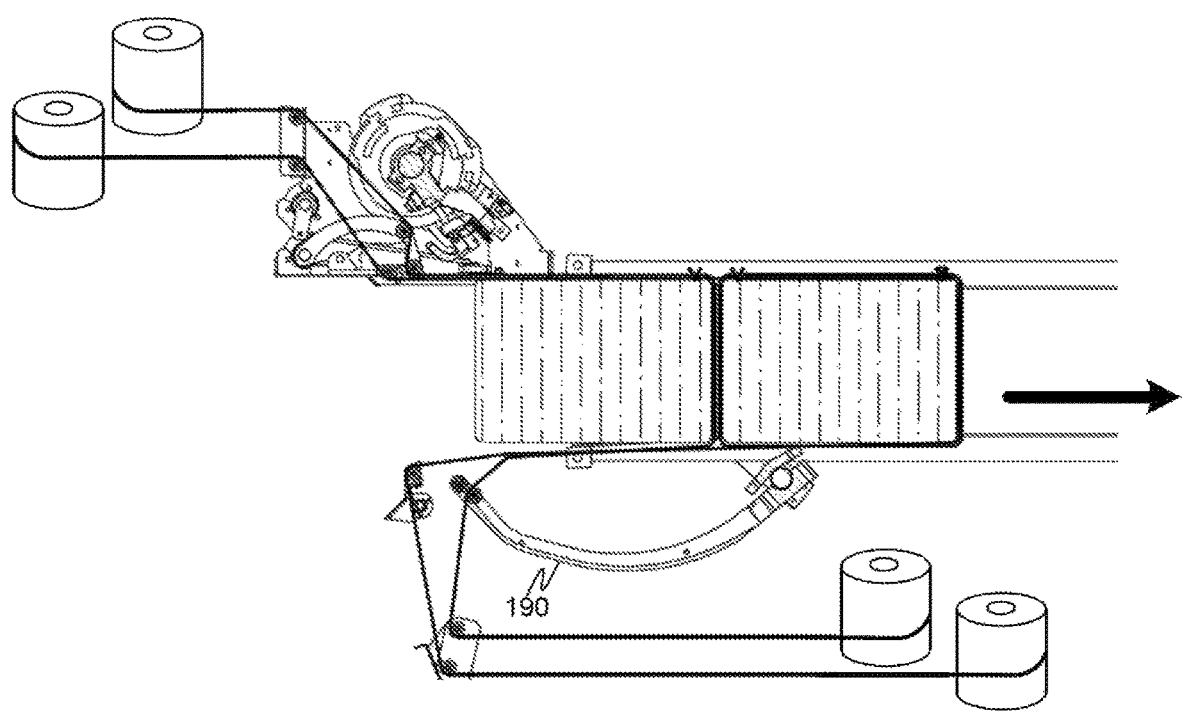
FIG. 1 depicts internal mechanisms of a multi-part square baler suitable for use with various embodiments disclosed herein.

10012 FIG. 1 depicts internal mechanisms of a multi-part square baler suitable for use with various embodiments disclosed herein. The present inventors work for the company where the multi-part square baler was invented. The multi-part square baler bales multiple smaller single bales into a large multi-part bale. U.S. patent application Ser. No. 16/175,780 entitled "High Density Double Small Square Baler"—owned by the same assignee as the present patent application—discloses the multi-part square baler. In working with implementations of the multi-part square baler the present inventors recognized a need for an improved knotter capable of reliably tying both 2-twine knots and 4-twine knots. Conventional knotters can only tie 2-twine knots. No conventional knotters are known to exist than are capable of tying 4-twine knots. In fact, prior to the present inventors' research and development efforts there wasn't a recognized need in the art to tie both 2-twine knots and 4-twine knots using the same knotter. Thus, no conventional knotter can tie both 2-twine knots and 4-twine knots. The various embodiments of a twine disk disclosed herein overcome these disadvantages of conventional knotters.

The present inventors recognized the importance of certain component shapes for the twine holding components in a mechanical knotter in preventing twine jams, twine slippage and other malfunctions. A component with an improper shape could, and often does, cause the knotter to malfunction or jam. For example, a component with an improper shape may result in unwanted twine slippage or may cause the twine to be over-stressed, which in turn could result in twine breakage. For at least these reasons a conventional 2-twine knotter with a semi-circular or oval shaped twine disk notch is only capable of reliably tying two strands of twine together without jamming, malfunctioning, twine slippage or over stressing the twine. As such the present inventors recognized certain problems and drawbacks that had not previously been recognized in the art.

The various embodiments disclosed herein involve a twine disk capable of gripping either four twines or two twines while sufficiently restricting the slippage of twine during the knotting process, and without the variation of twine quantities inhibiting its ability to grip the twine. The "knotting process" takes place in a mechanical knotter from the time two (or four) strands of twine are received (e.g., placed within) a notch of the knotter's twine disk until the competed knot is cut free from the knotter and any remaining twine stubs are knocked loose to be discarded. Through use of various embodiments disclosed herein a variable quantity twine knotter is able to tie both 2-twine knots and also 4-twine knots without unwanted twine slippage or over-stressing the twine.

The present inventors hypothesized that one explanation for these observations lies in the shape of the notches of the conventional twine disks. Conventional twine disk notches typically have a notch profile that is semicircular or oval in shape. The present inventors recognized that the twine strands, as they are pressed into the notch of the twine disk, tend to spread out—thus equalizing the pressure on each strand. However, the present inventors noticed that when four twines are held by a conventional twine disk, the twines occasionally enter the rounded conventional twine notch in a way that causes three strands to stack together and one to remain alone. The pressure from the twine holder is then imparted solely to the stack of three twines and the fourth receives little or no pressure. This, in turn, results in the single unstacked twine being easily pulled through the notch by its tension causing the knotting process to fail.

The various embodiments disclosed herein provide a solution to the problems described above. To deal with the problem of twine slippage, the novel new twine disk's notch shape, as disclosed herein, is such that it encourages three twines to stack, but also presses the fourth into the edge of the notch to maintain pressures on it as well. Use of the various embodiments disclosed herein allows a mechanical knotter to successfully alternate between tying two twined knots and four twined knots. Twine disks are typically made of steel or iron so as to be durable enough to not wear away as many miles of twine are pulled through the notches in the twine disk. However, twine disks could be made of any material of sufficient durability including various types of plastics, composites, ceramics, metals or other materials known to those of skill in the art.

Figure 2A:
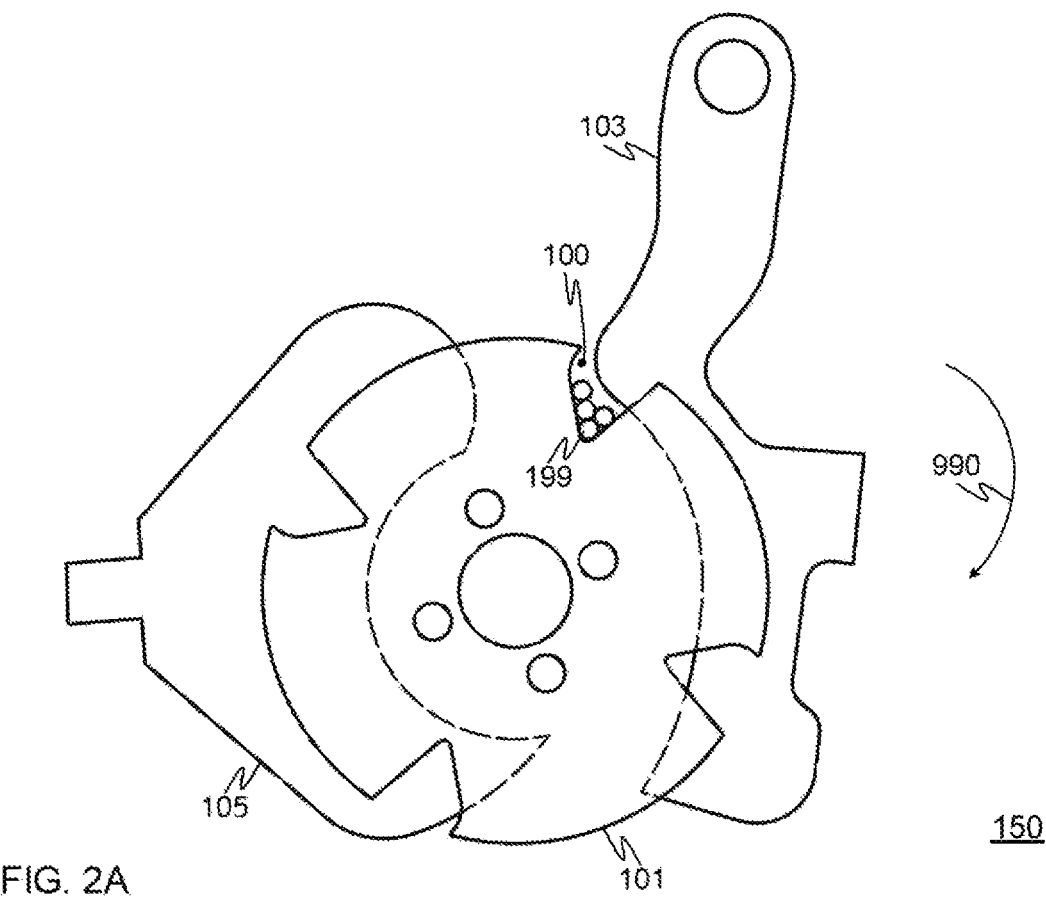
FIG. 2A depicts a twine holding assembly including a twine disk configured with a vee shaped V-notch according to various embodiments.

FIG. 2A depicts a twine holding assembly 150 including a twine disk 101 configured with a vee shaped V-notch 100 according to various embodiments disclosed herein. The twine disk 101 is a generally circular component with a number of identical V-notches 100 cut or otherwise formed into it. To ease illustration of the various embodiments, this document describes a single V-notch 100. However, in various embodiments a twine disk 101 may be produced with four V-notches 100, as shown in FIG. 2A. Further, various implementations of twine disks 101 may be produced with any number, either greater or less than four, of V-notches 100.

The V-notch 100 extends inward from an outer periphery toward the center of twine disk 101. In some embodiments the vee formed by the V-notch 100 may be symmetrical about a line drawn through the center of twine disk 101 and V-notch 100. In other embodiments the vee formed by the V-notch 100 may be tilted slightly with respect to a line drawn through the center of twine disk 101 and V-notch 100—e.g., tilted anywhere from 0 to 30 degrees or any range within those extremes.

In addition to a twine disk 101 a twine holding assembly 150 typically includes a twine holder 103 and a stripper plate 105. The stripper plate 105 typically has multiple V-notches 100 at locations positioned around its circumference surface. FIG. 2A shows four V-notches 100 cut into stripper plate 105 at positions equidistance around its circumference surface. A cross-section view of four strands of twine 199 is also shown in FIG. 2A. The circles labeled 199 are representative of twine strands, since in practice strands of twine are not perfectly round. However, averaging a number of cross-sections along a length of twine will result in a roughly round shape.

The strands of twine 199 are placed in the V-notch 100 by mechanical arm of the knotter called a needle. (Needle 190 is shown in FIG. 1.) During the knotting process twine disk 101 rotates in direction 990 relative to twine holder 103. This traps the strands of twine between the twine holder 103 and the bottom of V-notch 101. The twine holder 103 is shaped such that its inner gradually slopes towards the center of the twine disk 101. As twine disk 101 continues to rotate for approximately 90 degrees the twine strands 199 are pressed with increasing force to the bottom of V-notch 100, deforming and flattening out the twine 199 against the bottom of the V-notch 100. The knot is being formed and cut during the time the twine disk 101 is rotating and the twine holder 103 is pressing the twine 199 against the bottom of the V-notch 100. In various embodiments of knotters the twine 199 is cut on both sides of the twine disk 101, leaving short stubs of waste twine an inch or two long pressed to the bottom of V-notch 100. These short stubs of waste twine fall out and are discarded as the twine disk continues to rotate causing the V-notch 100 to move past the edge of the twine holder 103.

Figure 2B:
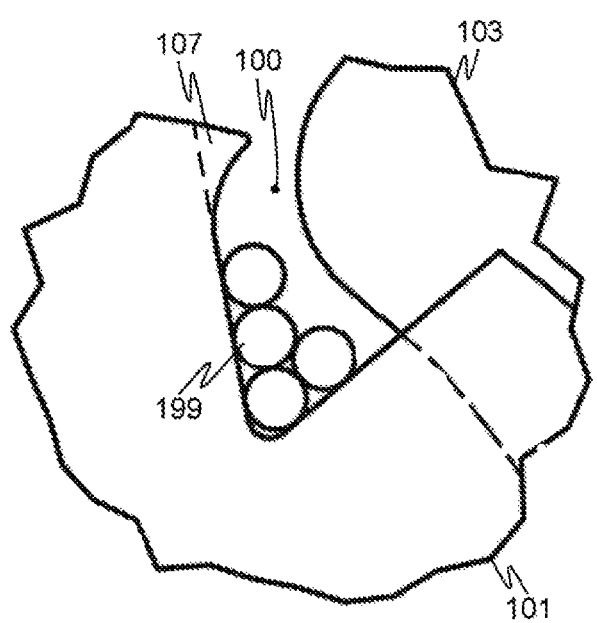
FIG. 2B depicts a V-notch of a twine disk in an enlarged cutaway view of FIG. 2A in accordance with various embodiments.

FIG. 2B depicts V-notch 100 in an enlarged cutaway view of FIG. 2A in accordance with various embodiments. As in the previous figure, FIG. 2B depicts portions of the twine holder 103 and the stripper plate 105 along with a cross-sectional view of the four strands of twine 199.

The V-notch 100 may be configured with a hook portion 107 near the outer circumference surface of stripper plate 105. The hook portion 107 shown in FIG. 3 extends inward from the flat surface of V-notch 100 to aid in keeping the twines 199 within the V-notch 100 as the twine is pulled through and manipulated during the knot tying process. The tip of hook portion 107 is typically rounded off slightly, rather than leaving a sharp point that could possibly catch on one of the twines 199. The flat surfaces of V-notch 100 are labeled straight edge portions 11 and 113. Thus, the hook portion 107 can be said to extend inward from straight edge portion 111 towards straight edge portion 113. In other equivalent embodiments the hook portion 107 extends inward from straight edge portion 113 towards straight edge portion 111.

Figure 3:
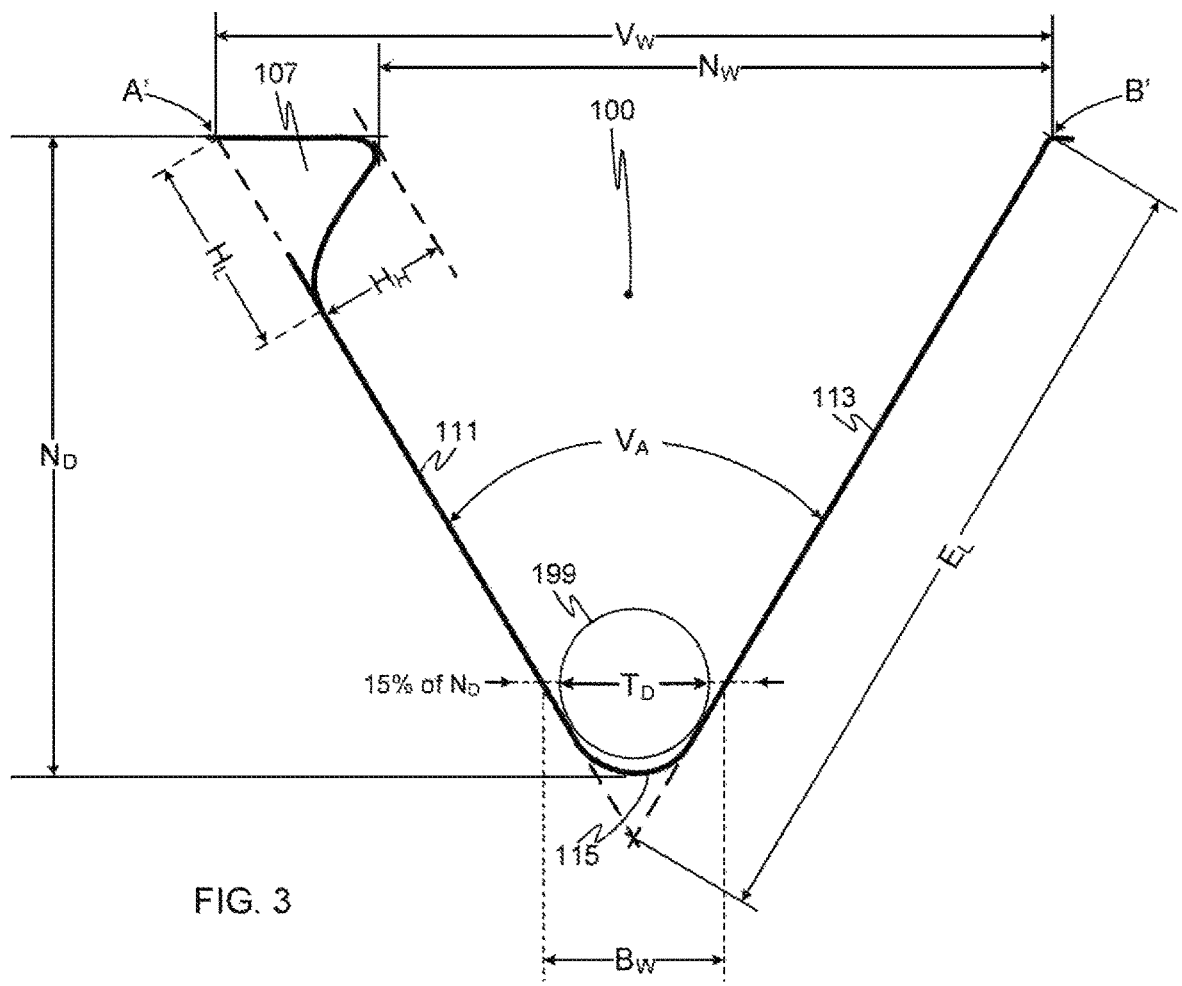
FIG. 3 depicts the shape of a notch 100 in accordance with various embodiments.

FIG. 3 depicts the shape of a V-notch 100 in accordance with various embodiments. The V-notch 100 is shown with a single strand of twine 199, for reference purposes. The twine 199 is a typical size suitable for use with the V-notch 100 illustrated in the figure. The twine strand 199 shown in FIG. 3 has an average twine diameter of $T_D$. As a matter of practice baling twine is not quantified or sold by the measured diameter. In fact, it's difficult to accurately state a measurement since the diameter of baling twine varies somewhat as it comes under tension. As baling twine is pulled its diameter decreases somewhat. The amount the baling twine diameter varies is affected by a number of factors, including: the material the twine is made from, the force pulling on the twine, the temperature, whether the twine is wet or dry, etc.

Baling twine may be quantified by pounds of knot strength, which roughly equates to the minimum amount of weight in pounds that could cause a knot in the twine to fail. Twine in common usage includes knot strengths of from 130 to 500 pounds or higher. Baling twine is also measured in terms its tensile strength, generally stated as kilogram force (Kgf). The Kgf measurement of a twine is the force, in kilograms, that will cause a single unknotted strand of twine to break. The various embodiments, however, are described in terms of geometric shapes and dimensions. The figures show cross-sections of a typical baling twine as it interfaces with the components of a twine holding assembly and vee shaped notch. For illustrative purposes, the average diameter of a twine strand is assumed to be 118 inch.

Turning to FIG. 3 again, the V-notch 100 has a notch depth of $N_D$, a notch width of $N_W$, and a vee width of $V_W$. The vee width $V_W$ is less than the notch width $N_W$ by the amount that hook portion 107 extends laterally over the V-notch 100. Various embodiments of the V-notch 100 tend to be deeper (have a greater notch depth of $N_D$) for a given notch width $N_W$ than conventional twine disk notches having the same notch width.

Moreover, various embodiments of the V-notch 100 tend to be narrower towards the bottom as compared to the top opening (e.g., $V_W$). The bottom-width factor provides one measure of this. The bottom-width factor is calculated by taking with the width measurement of a chamber (or notch) 15% above its lowest point ($B_W$), and dividing that $B_W$ measurement by the width measurement of its mouth, $V_W$ (generally expressed as a digital number between 0.00 and 1.00—e.g., 0.45). In other words, the notch's bottom-width factor is $B_W/V_W$, as per the labels of FIG. 3. The $B_W$ measurement is taken 15% above the lowest point of the notch to avoid inaccuracies in measuring an increasingly narrowing notch that comes to a point at the bottom. Various embodiments of the V-notch 100 may be characterized by various ranges of the bottom-width factor. For example, some embodiments have a bottom-width factor of no greater than 0.45. Other embodiments have a bottom-width factor of no greater than 0.40. Similarly, other ranges associated with yet other embodiments include upper limits of: no greater than 0.35, or no greater than 0.30, or no greater than 0.25 or an upper limit no greater than 0.20. Conventional twine disk notches typically have a bottom-width factor somewhat greater than 0.50.

Various embodiments of the V-notch 100 typically have a bottom curved portion 115. Depending upon the implementation and the type of twine anticipated for use, the radius may be as much as three times the twine radius $T_D$ or may be as little as 10% of the twine radius $T_D$. In some embodiments the bottom curved portion 115 is close to the same size as the twine radius, being equal to one-half of $T_D$+/_20%, as shown in FIG. 3. In some embodiments the bottom may come to a point as in two straight lines intersecting—for example, in the manner of the two intersecting dotted lines towards the bottom of V-notch 100 shown in FIG. 3. In other embodiments the bottom may have a flat portion connecting the two sides. The flat portion is typically something up to the width of a twine radius $T_D$, or any range from zero to $T_D$, but may in some implementations be any width up to twice the twine radius $T_D$. The full pointed vee length associated with V-notch 100 (including the dotted line portion that extends downward below the bottom curved portion 115) is represented on FIG. 3 as $E_1$.

In various embodiments the two sides of the V-notch 100 may be two straight edge portions 111 and 113. The straight edge portion 111 has a length $L_{11}$ which is defined as the length between where the rounded bottom 115 levels out to where the hook portion 107 begins. The straight edge portion 111 has a length $L_{11}$ which is defined as the length between where the rounded bottom 115 levels out to where the hook portion 107 begins. In the embodiment depicted in FIG. 3 the length of the two straight edge portions 111 and 113 make up about 73% of the entire edge of V-notch 100 from point A' to point B'. The amount of space the two straight edge portions take up varies depending upon the particularities of the implementation—for example, depending upon the size of the hook portion 107 and the rounded bottom 115. In various embodiments the two straight edge portions may take up as much as 88% to as little as 50% of the edge of V-notch 100 from point A' to point B'.

The hook portion 107 is defined as the material that extends inward (i.e., into the V-notch area) inside a straight edge of the V-notch 100. The dotted line shown near hook portion 107 extends from the straight edge on the left side of the V-notch 100, showing the extent of the hook portion 107. The hook height $H_H$ of hook portion 107 is defined as the distance that the hook portion 107 extends from a straight line (e.g., the dotted line) defining the straight edge portion 111 inward into the V-notch 100 in a direction perpendicular to straight edge portion 111. As such, the hook portion 107 is said to extend from the straight edge portion 111 (even though hook portion 107 could actually be considered adjacent the straight edge portion 111).

A typical value for the hook height $H_H$ is within the range of the twine diameter $T_D$+/_35% of the $T_D$. However, in various embodiments the hook height $H_H$ may be as large as three times the twine diameter $T_D$ or as small as 15% of the twine diameter $T_D$, or any value or range between these two extremes. Since the physical size of the twine may sometimes be difficult to quantify, the typical value for the hook height $H_H$ can also be compared to the length of the straight edge portion 11 or to straight edge portion 113. For example, a typical value for the hook height HI is within the range of 0.20+/_0.07 of the length of the straight edge portion 113. The hook height $H_H$ may also be within the range of up to 0.22 of the length of straight edge portion 113, or within the range of up to 0.27 of the length of straight edge portion 113, or within the range of up to 0.35 of the length of straight edge portion 113. A typical value for the hook length $H_L$ is within the range of 0.28+/_0.098 of the length of the straight edge portion 113. The hook length $H_L$ may also be within the range of up to 0.35 of the length of straight edge portion 113, or within the range of up to 0.50 of the length of straight edge portion 113. The tip of the hook portion 107 is typically rounded off to avoid snagging or catching the twine as it enters into the notch and is released. The rounded tip of hook portion 107 typically has a radius of no greater than 50% of a twine diameter $T_D$.

The V-notch 100 depicted in FIG. 3 has a vee angle $V_A$ of 60 degrees. In various embodiments the V-notch 100 may have a vee angle $V_A$ of as little as 30 degrees to as great as 120 degrees, depending upon the type and size of twine being used. Vee angles within the range of 60+/_15 degrees are typical. Depending upon the requirements of the implementation, some embodiments may fall within the vee angle range of 60+/_25 degrees.

The V-notch 100 is directed approximately toward the center of the twine disk 101, that is, towards the center of rotation of twine disk 101. In contrast to the notches of common twine disks today, the V-notch 100 is substantially deeper, typically at least 20% deeper or more. Further, the various V-notch 100 embodiments are vee shaped, and as such, tend to be narrower towards the bottom of the notch— as measured at the bottom of the two straight edge portions 111 and 113. For example, the embodiment depicted in FIG. 3 measures slightly less than one twine diameter $T_D$ in width as measured 0.5 $T_D$ from the lowest point of the rounded bottom 115. By contrast, a conventional semi-circular twine notch measures over two and one-half twine diameters $T_D$ in width as measured 0.5 $T_D$ from the lowest point of the conventional notch. The bottom of the V-notch 100 is the rounded bottom 115 which coincides with the portion of the notch closest to the center of twine disk 101.

The shape of the V-notch 100 encourages three twine strands 199 to triangularly stack in the base of V-notch 100 and encourages the fourth twine strand 199 to fall on top of the stack. In this way all four twines 199 may then be pressed into the V-notch 100 by the twine holder 103, without leaving one strand free of pressure and susceptible to being improperly knotted. In the case of the knotter tying a two twined knot, two twine strands 199 are deposited in the twine disk 101's V-notch 100. The shape of the V-notch 100 ensures that both of the two twine strands 199 are firmly gripped by twine holder 103 during the knotting process.

Figure 4:
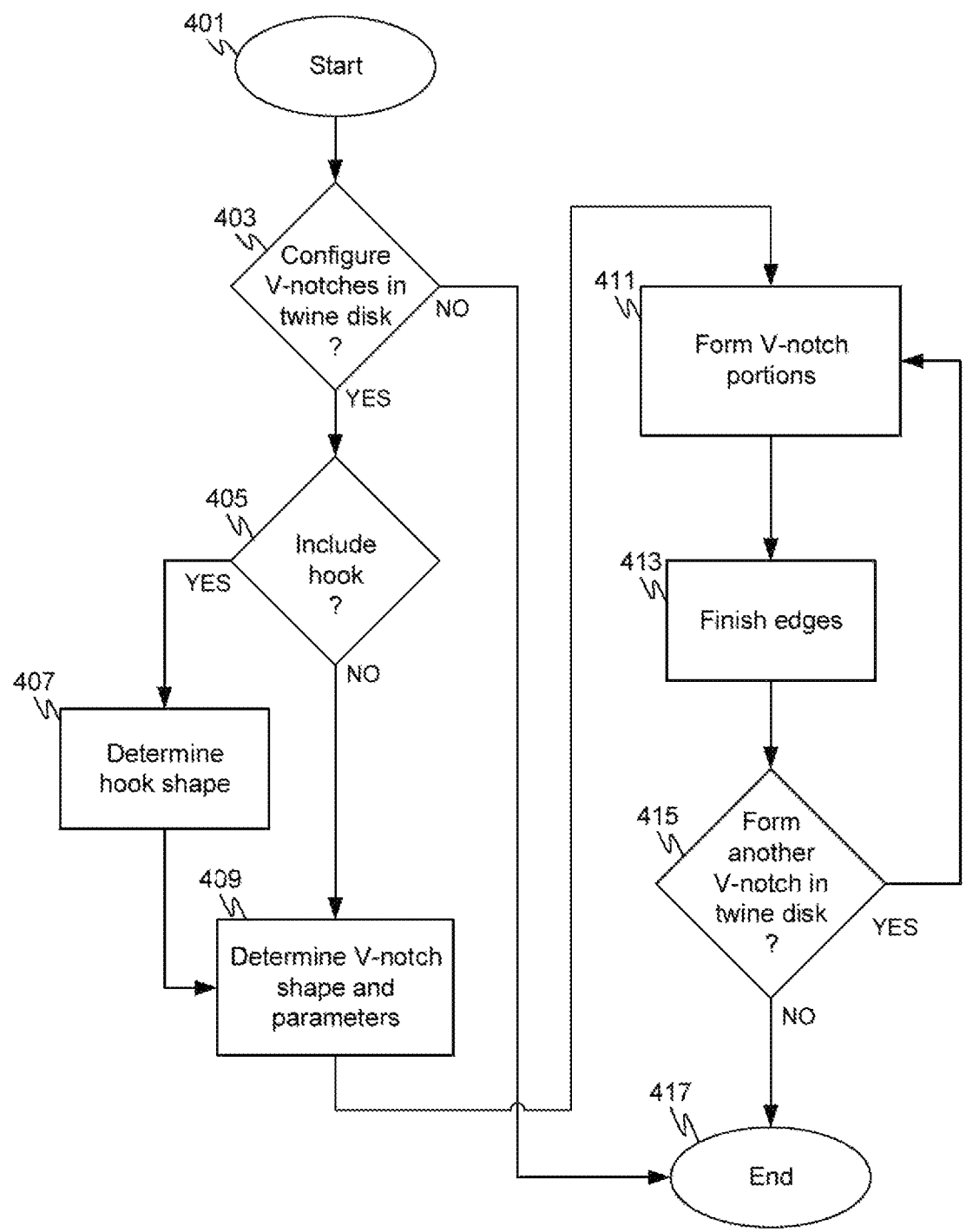
FIG. 4 depicts the flowchart of a method of producing the V-notch of a twine disk in accordance with various embodiments.

FIG. 4 depicts the flowchart of a method of producing the V-notch of a twine disk in accordance with various embodiments. The method begins at block 401 and proceeds to 403 to determine whether or not V-notches are to be formed in the twine disk as opposed to conventional semi-circular or oval notches. If vee shaped V-notches are to be formed the method proceeds along the "YES" path to block 403.

In block 403 it is determined whether or not a hook is to be formed within the V-notch. If it is determined that the V-notch is to include a hook the method proceeds along the "YES" path to block 407 to determine the shape and parameters of the hook—for example, the hook shape, the hook height $H_H$ and the hook length $H_L$. The method then proceeds to block 409. However, if it is determined back in block 405 that no hook is to be formed the method proceeds along the "NO" path to block 409.

In block 409 the shape of the V-notch and its parameters are to be determined. The parameters include, for example, the notch depth $N_D$, the notch width $N_W$, the vee angle $V_A$, as well as the shape and dimensions of the bottom of the V-notch which in turn determines the bottom-width factor. Once the V-notch shape and parameters are determined in block 409 the method proceeds to block 411.

In block 411 the various portions of the V-notch are formed, including for example, the hook portion, the straight edge portions and the bottom portion which may be a bottom curved portion. The V-notch may be cut with a saw or grinder, or machined out, or formed in a forge or mold in any manner known to those of ordinary skill in the art. Once the various portions are formed the method proceeds to block 413 to finish the edges. The edges of the various portions may be rounded, or chamfered or otherwise machined or polished to remove sharp edges that may snag on the twine causing a jam or malfunction. Once the edges are finished in block 413 the method proceeds to block 415.

In block 415 it is determined whether another V-notch is to be formed. Typical twine disk implementations have four V-notches in them, but could be made to have any number depending upon the requirements of the implantation. If more V-notches are to be formed the method proceeds along the "YES" path back to block 411 to form another V-notch. This presumes the next V-notch to be made has the same shape and parameters. It could be the case in which V-notches of a different shapes are formed into the same twine disk. In such situations the method would proceed from block 415 back to block 405 to begin the process again. If it is determined in block 415 that no further V-notches are to be formed the method proceeds to block 417 and ends.

Some of the activities in the method described above may be excluded or performed in a different order than shown in FIG. 4, as is known by those of ordinary skill in the art, while still remaining within the scope of at least one of the various embodiments. For example, the finishing of the edges (block 413) could be performed after forming each portion of the V-notch rather than all at once after the entire V-notch is formed. One of ordinary skill in the art would know that other activities may either be omitted or performed in a different order than that depicted in FIG. 4.

For ease and accuracy in describing the various embodiments the directional terms "right," "left," "up" and "down" are used in this disclosure. These terms refer to the directions right, left, up and down as viewed from the perspective of looking towards the V-notch 100 as shown in FIG. 3. The term "lateral" means from side to side, that is, left to right. Something positioned laterally adjacent to a component is positioned adjacent the component on either the left side or the right side. The term "vertical" is defined by a line extending up from the center of the earth through the object. The "horizontal" direction is orthogonal to the vertical direction. The term "below" as in "below the hook portion" means further down into the V-notch than the hook portion. For example, the straight edge portion adjacent the hook portion is considered "below" it since it is further into the V-notch.

The term "V-notch", as used throughout this document, is intended to mean a vee shaped notch in the twine disk of a hay baler. A V-notch may, or may not, have a hook formed towards the top of one or both sides of the notch. For ease of description, this document refers to a twine disk being part of a hay baler. However, it should be understood that the term "hay" in hay baler is merely a common example of a type of baler. The term "hay baler" as used throughout this disclosure and in the claims may refer to any type of baler that fastens loose object with twine into a bale. A bale is a bundle of hay, cotton, or other materials tightly wrapped and bound with twine. Although the descriptions in this document refers mostly to hay bales for ease of illustration, the various embodiments may be implemented with any number of crops or other materials aside from hay. For example, a twine disk configured for use in a "hay baler" according to the various embodiments may be used to make bales of hay, straw, grass, corn stalks, pine needles, sugar cane mulch, or any other types of plant stems, stalks, shafts, sticks, and/or leaves from any plants known to those of ordinary skill in the art. Moreover, the various embodiments of a twine disk configured for use in a "hay baler" may be implemented with any number of other non-plant materials formed into bales, including for example, paper, lumber, shingles, pipe, tubing, insulation, bricks, tiles or any other material that can be baled for transport or storage, as such materials are known by those of ordinary skill in the art. This document uses the term "twine" to describe the material used to create bales. "Twine" as used herein is defined to include string, rope, cord, wire, strapping, or other long flexible strands that one of ordinary skill in the art considers suitable for use in a baler.

A given line is a "substantially straight-line" if it does not vary by more than +/_5% from a straight-line path. The straight-line path used to determine this is the average straight-line path drawn through the distance covered by the given line. The average straight-line path is the straight line that has the smallest average distance between the itself and all adjacent points along the given line (disregarding the +/− signs of the differences—that is, plus and minus differences don't offset each other.) To determine whether the given line is a substantially straight-line, first the average straight-line path is drawn through the distance covered by the given line. Then the average straight-line path is measured to determine 5% of its length, and boundaries are drawn 5% above and below the average straight-line path, if the given line remains within these boundaries it is a "substantially straight-line". (Note: The beginning and ending points of the given line and the average straight-line path need not necessarily coincide.)

For an object (or shape) to be "vee shaped" as this term is used herein, the object must have two substantially straight-line slanting sidewalls (or edges) that are angle away from each other towards the top by an angle of at least 10 degrees but no greater than 120 degrees. The sidewalls may intersect at the bottom or may be connected by a bottom cross piece that is no greater than one-third the length of either sidewall.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and gist of the invention. The various embodiments included herein were chosen and described in order to best explain the principles of the invention and the practical application, and to enable others of ordinary skill in the art to understand the invention for various embodiments with various modifications as are suited to the particular use contemplated.

Design variations, including changes to the V-notch's vee angle, its depth or direction, and the linearity of the notch edges or other such variations, can be considered without departing from the scope and intent of this invention.

What is claimed is:

1. A twine disk configured for a mechanical knotter of a hay baler, the twine disk comprising:
    a vee shaped V-notch extending inward from an outer periphery of the twine disk, the V-notch including a mouth and a vertex;
    a first straight notch edge of the V-notch formed in a substantially straight-line and terminating at the vertex, the vertex comprising a bottom curved portion of the V-notch;
    a hook portion at the mouth of the V-notch, the hook portion interconnecting the outer periphery of the twine disk and the first straight notch edge of the V-notch, wherein the hook portion includes a straight hook edge and a concave hook edge, wherein the straight hook edge intersects the concave hook edge at a rounded terminus;
    a second straight notch edge of the V-notch formed in a substantially straight-line from the outer periphery of the twine disk to the bottom curved portion of the V-notch, the second straight notch edge forming a vee angle with the first straight notch edge of between 45 degrees and 120 degrees;
    wherein the V-notch is configured to accept and hold two twine strands and alternatively four twine strands during a knotting process of the hay baler, such that a lowermost one of the two twine strands and alternatively a lowermost one of the four twine strands is wedged against the first straight notch edge and the second straight knot edge when within the V-notch;
    wherein the V-notch defines a first width ($B_w$) at 15% above the vertex and defines a second width ($V_w$) across the mouth of the V-notch, inclusive of the hook portion, wherein a ratio of the first width (Bw) relative to the second width ($V_w$) is not more than 0.45.

2. The twine disk of claim 1, wherein the ratio of the first width (Bw) relative to the second width ($V_w$) is not more than 0.20.

3. The twine disk of claim 1, wherein the V-notch extends inward directly towards a center of the twine disk.

4. The twine disk of claim 1, wherein the V-notch is symmetrical below the hook portion about a line drawn through a center point of the twine disk and a lowest point in the V-notch.

5. The twine disk of claim 1, wherein the second straight notch edge forms a vee angle with the first straight notch edge of between 45 degrees and 90 degrees.

6. The twine disk of claim 1,
    wherein the hook portion has a hook height $H_H$ extending up from the first straight notch edge by a distance of up to 0.35 a length of the second straight notch edge; and
    wherein the hook portion has a hook length $H_L$ of up to 0.50 a length of the second straight notch edge.

7. The twine disk of claim 1,
    wherein the hook portion has a hook height $H_H$ extending up from the first straight notch edge by a distance of up to 0.25 a length of the second straight notch edge; and
    wherein the hook portion has a hook length $H_L$ of up to 0.35 a length of the second straight notch edge.

8. A method of producing a V-notch in a twine disk configured for a mechanical knotter of a hay baler, the method comprising:
    forming the V-notch in a vee shape extending inward from an outer periphery of the twine disk, the V-notch including a mouth and a vertex;
    forming a first straight notch edge of the V-notch in a substantially straight-line; and
    forming a second straight notch edge of the V-notch in a substantially straight-line, the second straight notch edge forming a vee angle with the first straight notch edge of between 45 degrees and 120 degrees;
    forming a bottom curved portion of the V-notch, wherein the first straight notch edge and the second straight notch edge each terminate at the bottom curved portion;
    forming a hook portion at the mouth of the V-notch, the hook portion, the hook portion extending inward from the first straight notch edge of the V-notch towards the second straight notch edge of the V-notch, wherein the hook portion includes a straight hook edge and a concave hook edge, wherein the straight hook edge intersects the concave hook edge at a rounded terminus;
    wherein the V-notch is configured to accept and hold two twine strands and alternatively four twine strands during a knotting process of the hay baler, such that a lowermost one of the two twine strands and alternatively a lowermost one of the four twine strands is wedged against the first straight notch edge and the second straight knot edge when within the V-notch;
    wherein the V-notch defines a first width ($B_w$) at 15% above the vertex and defines a second width ($V_w$) across the mouth of the V-notch, inclusive of the hook portion, wherein a ratio of the first width (Bw) relative to the second width ($V_w$) is not more than 0.45.

9. The method of claim 8, wherein the V-Notch is formed to be symmetrical below the hook portion about a line drawn through a center point of the twine disk and a lowest point in the V-notch.

10. The method of claim 8,
    wherein the hook portion is formed to have a hook height $H_H$ extending up from the first straight notch edge by a distance of up to 0.25 a length of the second straight notch edge; and
    wherein the hook portion is formed to have a hook length $H_L$ of up to 0.35 a length of the second straight notch edge.

* * * * *